US008986587B2

(12) United States Patent
Barakat

(10) Patent No.: US 8,986,587 B2
(45) Date of Patent: Mar. 24, 2015

(54) SYSTEM AND METHOD FOR MAKING POLYETHYLENE TEREPHTHALATE SHEETS AND OBJECTS

(75) Inventor: Nicholas P. Barakat, Germantown, TN (US)

(73) Assignee: Chemlink Capital, Stamford, CT (US)

( * ) Notice: Subject to any disclaimer, the term of this patent is extended or adjusted under 35 U.S.C. 154(b) by 1108 days.

(21) Appl. No.: 12/232,774

(22) Filed: Sep. 24, 2008

(65) Prior Publication Data
US 2009/0026641 A1 Jan. 29, 2009

Related U.S. Application Data

(60) Division of application No. 11/509,028, filed on Aug. 24, 2006, now Pat. No. 8,545,205, which is a continuation of application No. 11/270,314, filed on Nov. 8, 2005, now abandoned.

(60) Provisional application No. 60/626,142, filed on Nov. 8, 2004.

(51) Int. Cl.
B29B 9/12 (2006.01)
B29C 41/28 (2006.01)
(Continued)

(52) U.S. Cl.
CPC .............. *C08G 63/183* (2013.01); *B32B 37/15* (2013.01); *B29C 47/92* (2013.01); *B32B 2327/18* (2013.01)
USPC .......... 264/176.1; 264/5; 264/173.1; 264/299

(58) Field of Classification Search
CPC B29C 47/0021; B29C 47/0026; B29C 47/06; B29C 47/14; B29C 47/92; B29K 2023/0625; C08G 63/183; B32B 2327/18; B32B 2367/00; B32B 37/15

USPC ........ 264/176.1, 102, 537; 425/566; 156/209; 526/317.1
See application file for complete search history.

(56) References Cited

U.S. PATENT DOCUMENTS 2,988,578 A 6/1961 Fleck et al.
3,044,993 A 7/1962 Tiemersma
(Continued)

FOREIGN PATENT DOCUMENTS

DE 4040204 A1 7/1991
JP 52032965 A 3/1977
(Continued)

OTHER PUBLICATIONS

In U.S. Appl. No. 11/509,028 Final Office Action dated Feb. 1, 2011, 16 pages.
(Continued)

Primary Examiner — Philip Tucker
Assistant Examiner — Vicki Wu
(74) Attorney, Agent, or Firm — Squire Patton Boggs (US) LLP

(57) ABSTRACT

A system for making PET objects including a means for reacting a first PET precursor and a second PET precursor to produce a PET melt; a means for flowing the PET melt to a valve having at least two outlets; a means for flowing the PET melt from at least one of the at least two outlets to at least one distribution manifold, each of the at least one distribution manifold having at least two distribution lines; a means for controlling individually the mass flow of the PET melt in each of the at least two distribution lines independently of the other of the at least two distribution lines; and a means for forming the PET objects from the PET melt.

16 Claims, 4 Drawing Sheets

(51) Int. Cl.
  *B29C 41/00* (2006.01)
  *C08G 63/183* (2006.01)
  *B32B 37/15* (2006.01)
  *B29C 47/92* (2006.01)

(56) References Cited

U.S. PATENT DOCUMENTS

| | | | |
|---|---|---|---|
| 3,161,710 | A | 12/1964 | Turner |
| 3,381,074 | A | 4/1968 | Bryan et al. |
| 3,487,049 | A | 12/1969 | Busot |
| 3,496,261 | A | 2/1970 | Parr |
| 3,619,145 | A | 11/1971 | Crawford et al. |
| 3,671,620 | A | 6/1972 | Inoue |
| 3,689,461 | A | 9/1972 | Balint et al. |
| 3,781,213 | A | 12/1973 | Siclari et al. |
| 3,793,259 | A | 2/1974 | Brinkmann et al. |
| 3,924,840 | A | 12/1975 | Nelson, Jr. |
| 4,008,048 | A | 2/1977 | Hellemans et al. |
| 4,107,787 | A | 8/1978 | Ocker |
| 4,242,073 | A | 12/1980 | Tsuchiya et al. |
| 4,267,146 | A | 5/1981 | Kurtz et al. |
| 4,362,852 | A | 12/1982 | Pendlebury et al. |
| 4,372,910 | A | 2/1983 | Stroup et al. |
| 4,448,736 | A | 5/1984 | Emery et al. |
| 4,588,538 | A | 5/1986 | Chung et al. |
| 4,609,721 | A | 9/1986 | Kirshenbaum et al. |
| 4,675,378 | A | 6/1987 | Gibbon et al. |
| 4,688,590 | A | 8/1987 | Anderheggen et al. |
| 4,728,701 | A | 3/1988 | Jarvis et al. |
| 4,820,588 | A | 4/1989 | Brinduse et al. |
| 4,868,006 | A * | 9/1989 | Yorkgitis et al. ............... 427/555 |
| 4,917,151 | A | 4/1990 | Blanchard et al. |
| 5,518,388 | A | 5/1996 | Swenor et al. |
| 5,597,891 | A | 1/1997 | Nelson et al. |
| 5,648,032 | A | 7/1997 | Nelson et al. |
| 5,651,928 | A * | 7/1997 | Hodan et al. ............. 264/172.11 |
| 5,656,719 | A | 8/1997 | Stibal et al. |
| 5,756,032 | A | 5/1998 | Lee et al. |
| 5,863,485 | A | 1/1999 | Groleau |
| 5,928,596 | A | 7/1999 | McLeod et al. |
| 5,945,460 | A | 8/1999 | Ekart et al. |
| 5,968,429 | A | 10/1999 | Treece et al. |
| 5,980,797 | A | 11/1999 | Shelby et al. |
| 6,099,778 | A | 8/2000 | Nelson et al. |
| 6,220,747 | B1 | 4/2001 | Gosselin |
| 6,241,508 | B1 | 6/2001 | John et al. |
| 6,296,732 | B1 * | 10/2001 | Enlow et al. .................. 156/209 |
| 6,309,686 | B1 | 10/2001 | Zietlow et al. |
| 6,402,873 | B1 | 6/2002 | Fujii et al. |
| 6,444,782 | B1 | 9/2002 | Hamlin |
| 6,592,913 | B2 | 7/2003 | Cook et al. |
| 6,638,456 | B2 | 10/2003 | Klein et al. |
| 6,719,399 | B2 | 4/2004 | Moffat et al. |
| 6,906,164 | B2 * | 6/2005 | DeBruin ..................... 528/308.1 |
| 6,913,806 | B2 * | 7/2005 | Jen ............................... 428/35.7 |
| 7,025,913 | B2 | 4/2006 | La Forest et al. |
| 7,323,529 | B2 | 1/2008 | Sutton et al. |
| 7,547,406 | B2 * | 6/2009 | Otto et al. ................ 264/328.17 |
| 7,588,704 | B2 | 9/2009 | Biederman et al. |
| 7,863,407 | B2 | 1/2011 | DeBruin et al. |
| 7,931,842 | B2 | 4/2011 | Barakat et al. |
| 2001/0053338 | A1 | 12/2001 | Bush et al. |
| 2002/0158372 | A1 | 10/2002 | Eckardt et al. |
| 2003/0020199 | A1 | 1/2003 | Kajikawa et al. |
| 2003/0102599 | A1 | 6/2003 | Du Toit |
| 2003/0202032 | A1 | 10/2003 | Moffat et al. |
| 2004/0089975 | A1 | 5/2004 | Sala et al. |
| 2004/0195712 | A1 | 10/2004 | Forest et al. |
| 2005/0161863 | A1 | 7/2005 | Otto et al. |
| 2005/0267285 | A1 | 12/2005 | Kulkarni et al. |
| 2007/0063374 | A1 | 3/2007 | Barakat |
| 2008/0136061 | A1 | 6/2008 | Peterson et al. |
| 2009/0039568 | A1 | 2/2009 | DeBruin et al. |
| 2009/0198036 | A1 | 8/2009 | Duffy |
| 2009/0212457 | A1 | 8/2009 | Barakat et al. |
| 2010/0127422 | A1 | 5/2010 | Otto et al. |

FOREIGN PATENT DOCUMENTS

| | | |
|---|---|---|
| JP | 53101056 A | 9/1978 |
| JP | 63049410 A | 3/1988 |

OTHER PUBLICATIONS

In U.S. Appl. No. 11/509,028 Final Office Action dated Mar. 12, 2012, 22 pages.
In U.S. Appl. No. 11/509,028 Final Office Action dated Oct. 1, 2008, 16 pages.
In U.S. Appl. No. 11/509,028 Non-Final Office Action dated Aug. 4, 2010, 18 pages.
In U.S. Appl. No. 11/509,028 Non-Final Office Action dated Jan. 14, 2008, 12 pages.
In U.S. Appl. No. 11/509,028 Non-Final Office Action dated Jun. 10, 2009, 12 pages.
In U.S. Appl. No. 11/509,028 Non-Final Office Action dated Jun. 23, 2011, 16 pages.
In U.S. Appl. No. 11/509,028 Non-Final Office Action dated Oct. 28, 2011, 18 pages.
In U.S. Appl. No. 13/181,882 Final Office Action dated Apr. 30, 2013, 16 pages.
In U.S. Appl. No. 13/181,882 Non-Final Office Action dated Apr. 28, 2014, 6 pages.
In U.S. Appl. No. 13/181,882 Non-Final Office Action dated Dec. 10, 2012, 13 pages.
In U.S. Appl. No. 13/181,882 Non-Final Office Action dated Jun. 5, 2012, 11 pages.
Aharoni, S.M.; "Industrial-Scale Production of Polyesters, Especially Poly(ethylene terephthalate)," *Handbook of Thermoplastic Polymers: Homopolymers, Copolymers, Blends, and Composites*, 2002; ISBN: 3-527-30113-5; pp. 59-103.
Primaplast—PET Material; retrieved from Internet Jan. 24, 2011, at http://www.primaplast.com/machine-4-4.html.
Pump Definition; retrieved from Internet Jan. 24, 2011, at http://www.yourdictionary.com/pump.
Rosato, D.V.; "Extruding Plastics—A practical processing handbook," *Chapman & Hall, an imprint of Thomson Science*; Kluwer Academic Publishers, Norwell, Massachusetts, 1998.

* cited by examiner

SYSTEM AND METHOD FOR MAKING POLYETHYLENE TEREPHTHALATE SHEETS AND OBJECTS

CROSS-REFERENCE TO RELATED APPLICATIONS

This application is a divisional application of U.S. patent application Ser. No. 11/509,028, filed 24 Aug. 2006 now U.S. Pat. No. 8,545,205, which is a continuation application of prior U.S. patent application Ser. No. 11/270,314, filed 8 Nov. 2005 now abandoned, which claims the benefit of U.S. Provisional Application No. 60/626,142, filed 8 Nov. 2004. The entireties of these aforementioned applications are incorporated herein by reference.

FIELD OF THE INVENTION

The present invention relates to a system and method for making polyethylene terephthalate sheets and objects.

PROBLEM

As outlined in U.S. Pat. No. 5,756,032, polyesters such as polyethylene terephthalate ("PET") are known to possess good chemical stability, physical and mechanical strength, durability, and heat resistance. Therefore, polyester has been widely used in manufacturing various articles including packaging and labeling devises. The performance appeal of polyester is very important and the ability to reduce the cost of materials using this polymer will greatly expand its use. Polyester is ranked between general purpose and engineering plastics and has been proven to be used for many applications. Polyester packaging materials in sheets is increasingly expanding and has a tendency to penetrate applications it had not been identified with. Consequently, the breakthrough to reduce its manufacturing cost for PET sheet applications and increase its mechanical and optical performance attributes for a great array of applications is an important step in meeting the cost and performance hurdles against competitive polymers and thereby expanding its attractiveness for new applications. Particularly, stiffness and impact performance of the PET sheet is an important functional attribute as it allows for the PET sheet caliper to be reduced. These sheets can be converted into rolls of different diameters or directly slit into sheets. PET and amorphous polyethylene terephthalate ("APET") resin are used interchangeably as the resin used to manufacture the APET rigid film.

Under the traditional manufacturing process, a multi-stage process is used to produce the final PET or APET product. Initially, a relatively low molecular weight precursor polymer is prepared by melt-phase polymerization techniques commonly known in the art. As explained in U.S. Pat. No. 5,736,621, the customary route for the manufacture of polyester resin comprises polycondensation, the first step being carried out up to a moderate molecular weight corresponding to an average intrinsic or inherent viscosity ("I.V.") of about 0.5-0.7 deciliters/gram ("dl/gm") in the melt and further condensation being carried in the solid phase. For condensation in the solid stage, the polyester chips are heated under reduced temperature until the desired molecular weight is reached.

The precursor is then cooled and shaped into pellets, and then possibly crystallized, and subjected to further solid-state polymerization at a lower temperature. Gases may be used to strip the glycols, aldehydes, and other reaction byproducts from the PET pellets, which also contributes to increasing the I.V. value. This is followed by the PET pellets being commonly stored in ambient air where the hygroscopic pellets pick up moisture from the air, thus requiring the pellets to be dried before they are reheated and melted in an extruder in communication with a die. Typically, the PET pellets are dried to less than 0.025% moisture content. If resin is dried prior to delivery to the sheet plant, the material will have to be stored under dry nitrogen.

The means for preparing the PET sheets from various forms and viscosities of PET has been known to require the use of PET pellets. Each quality of PET resins have problems of their own as a result of the PET material's hydroscopicity and its deterioration during the extrusion process. Such technique; however, requires the use of intermediate manufacturing processes and transportation. Items produced using the extrusion system or rotary die method produce parts of varied calipers.

The resin is extruded through an extruder, and the barrel of the extruder may have vacuum venting in order to remove the humidity created during the extrusion process. A melt pump is used in order to produce an even melt throughput as it is pushed towards the extrusion die. Next, the molten resin is formed into a sheet by passing through an extrusion die. In the case of the rotary die, the objects are manufactured directly onto the rotary die and do not pass through the sheet phase. The sheet is then polished in a roll stack or passed through a calendar stack where the sheet is sized to the appropriate thickness. The sheet can then be surface treated with silicone on one or both sides. In the case of strapping material, the sheet is typically slit into strapping material. Finally, the sheet is then wound into a roll or slit and cut into finished sheets. In the case of the thick sheets, the sheets are typically not rolled.

These various processes affect the PET pellets performance when they are converted into a sheet form or injected onto a rotary die. In general the physical properties of PET, such as its hygroscopicity in pellet form, negatively impact the polyester optical properties of the finished product if not adequately conditioned. When extruded, side reactions lead to the degradation of the polyester chain negatively impacting the properties. Furthermore, it has been a common practice to compensate for some of PET pellets negative performances as pertaining to the hydroscopicity and degradation the I.V. levels during the extrusion process.

In addition, during the processing of polyesters in the melt phase, certain undesirable by-products are formed. One such by-product is acetaldehyde, which is continually formed as a by-product during the polymerization and subsequent melt processing of polyesters. Acetaldehyde is known to contaminate food or beverage products when it is present in a food or beverage container. Therefore, it is desirable to produce molded polyester containers having an acetaldehyde content at a low or zero level.

Additionally, there are methods decribing tying a reactor to a ram system to inject polymer into a mold. Other patents allude to a continuous system but do not allow for uniform part production in multiple streams.

Information relevant to attempts to address these problems can be found in the U.S. Pat. No. 5,656,719 issued 12 Aug. 1997 to Stibal et al.; U.S. Pat. No. 5,980,797 issued 9 Nov. 1999 to Shelby et al.; U.S. Pat. No. 5,968,429 issued 19 Oct. 1999 to Treec et al.; U.S. Pat. No. 5,756,032 issued 26 May 1998 to Stibal et al.; U.S. Pat. No. 6,099,778 issued 8 Aug. 2000 to Nelson et al; and published U.S. patent application Ser. Nos. 10/996,352 filed 14 Oct. 2004 by Otto et al.

SOLUTION

The above-described problems are solved and a technical advance achieved by the present system and method for making a mono or multilayer polyethylene terephthalate ("PET") sheets ("system for making PET sheets") at a lower cost and which display excellent mechanical and optical properties by way of eliminating certain manufacturing process steps and directly passing the PET melt from the reactor through a die and onto a surface instead of melting PET resin in pellets through an extruder and then onto a surface. By avoiding a series of manufacturing steps whereby the PET melt is conditioned and altered during the preparation and extrusion process the optical and mechanical properties of the original PET melt coming out of the reactor does not deteriorate or capture humidity. These are very important steps as these intermediary steps above are eliminated as the PET resin is already in a melt phase and therefore does not have to be melted down through an extruder and also because no transportation was required which because of the hygroscopic nature of the pellet required a treatment of nitrogen. In addition, the multiplayer PET may be manufactured using other substrates in one or more of the layers. The present system for making PET sheets allows for the preparation of particularly high quality PET sheets under mild reaction conditions since the PET is never converted into pellets and re-melted through an extruder.

The present system for making PET sheets which can be effectively thermoformed into containers as well as slit into strapping material and when prepared into thick sheets can be used for display material for inside and outdoor signage. As the present system for making PET sheets pertains to the manufacture of items directly from the extruder die onto a sheet forming system or a rotary die, the results are the same, a superior product at a lower caliper without passing through the pellet stage, thus maintaining its I.V. level and inherent stiffness that translates into a higher mechanical performance. The present system for making PET sheets is a process by which a continuous PET reactor system is coupled to a series of forming subsystems while maintaining constant pressure in each subsystem independent of the operating conditions of the other subsystems. Thus speed changes, start-ups, shut-downs, and break downs are all overcome by the present system for making PET sheets.

In one aspect, the present system for making PET sheets extrudes products such as sheets or objects with a rotary die directly from PET melt prepared from the polymerization reactor. The uniqueness of this present system for making PET sheets is in the handling of the melt stream from the reactor to the die. In order to extrude the melt through a die and maintain part thickness control, rigid control of the pressure entering each die needs to be maintained at a uniform set pressure and within tight tolerance. The present system for making PET sheets applies to controlling pressure into the die(s) feeding the forming device(s). A side chip stream is added to the multiple forming lines as well as a plurality of pumps prior to the die(s). These novel additions allow for uniform part formation.

The present system for making PET sheets produces high quality PET sheets in continuous and discontinuous forms wherein the PET melt is obtained directly from the esterification and after the polymerization stage in the PET reactor using Pure Terephthalate Acid (PTA) or Dimethyl Terephthalate (DMT) and Mono Ethylene Glycol (MEG) and passed through the die directly onto a receiving surface without being converted into pellets. In another aspect, other types of glycols may be used, such as diethylene glycol and the like. PET sheets produced by the above methods are manufactured at a lower cost, have a high structural homogeneity, enhanced optical properties and excellent mechanical strength. In the case of the manufacture of items directly from the reactor onto a rotary die, the results are the same, except the products manufactured are not previously converted into sheets, but formed into their final configuration.

In addition, the extruder, when coupled to a melt reactor and appropriately controlled, provides a material requiring no preconditioning and whose thermal history is minimized. This coupling simplifies the process and leads to a better finished product. The negation of intermediate process steps, such as pelletizing and drying, reduce the overall manufacturing cost. Furthermore, the present system for making PET sheets simplifies the manufacturing process to manufacture PET sheets and items on a rotary die where the polymer does not have to be treated prior to be processed through the extrusion die.

Also the lack of humidity in the PET melt increases the PET resin optical properties and performance at the rigid film manufacturing stage. Both end use properties achieved through this manufacturing process result in sheet quality, which are greatly important to thermoformers and end users. Also the trim and other waste generated as part of the process is of high quality in terms of I.V. readings and can be blended with virgin PET resins in the preparation process.

PET sheets produced by the above methods are manufactured at a lower cost, have a high structural homogeneity, enhanced optical properties and excellent mechanical strength. In the case of the manufacture of items directly from the reactor onto a rotary die, the results are the same, except the products manufactured are not previously converted into sheets, but formed into their final configuration.

SUMMARY

Preferably, the system for making PET objects includes means for reacting a first PET precursor and a second PET precursor to produce a PET melt; means for flowing the PET melt to a valve having at least two outlets; means for flowing the PET melt from at least one of the at least two outlets to at least one distribution manifold, each of the at least one distribution manifold having at least two distribution lines; means for controlling individually the mass flow of the PET melt in each of the at least two distribution lines independently of the other of said at least two distribution lines; and means for forming the PET objects from the PET melt. Preferably, the system further includes means for flowing the PET from one of the at least two outlets to a side chip stream for forming pellets. Preferably, the means for reacting takes place within a temperature range of from about 200° C. to about 330° C.

Preferably, first PET precursor is selected from the group consisting of Pure Terephthalate Acid (PTA) or Dimethyl Terephthalate (DMI) and the second PET precursor is Mono Ethylene Glycol (MEG) or Diethylene Glycol (DEG). In another aspect of the present invention, secondary precursors, such as Cyclohexanedimethanol (CHDM) may be used in combination with the primary precursors, such as MEG. In this aspect, the final product is a glycolized polyester (PETG). Preferably, the system further includes means for reducing the acetaldehyde content of the PET melt. Preferably, the means for controlling individually the mass flow of the PET melt includes means for controlling the pressure of the PET melt with pressure control loops prior to the forming the PET objects. Preferably, the PET objects are selected from the group consisting of PET articles, PET sheets, strapping, and architectural items. Preferably, means for forming PET objects further includes means for adding at least one side extruder to produce a multi-layered PET sheet or object. Preferably, the system further includes means for producing a laminated structure selected from the group consisting of foil and EVOh structure. Preferably, the system further includes means for filtering said PET melt prior to the forming the PET objects.

DETAILED DESCRIPTION OF THE DRAWINGS

Figure 1:
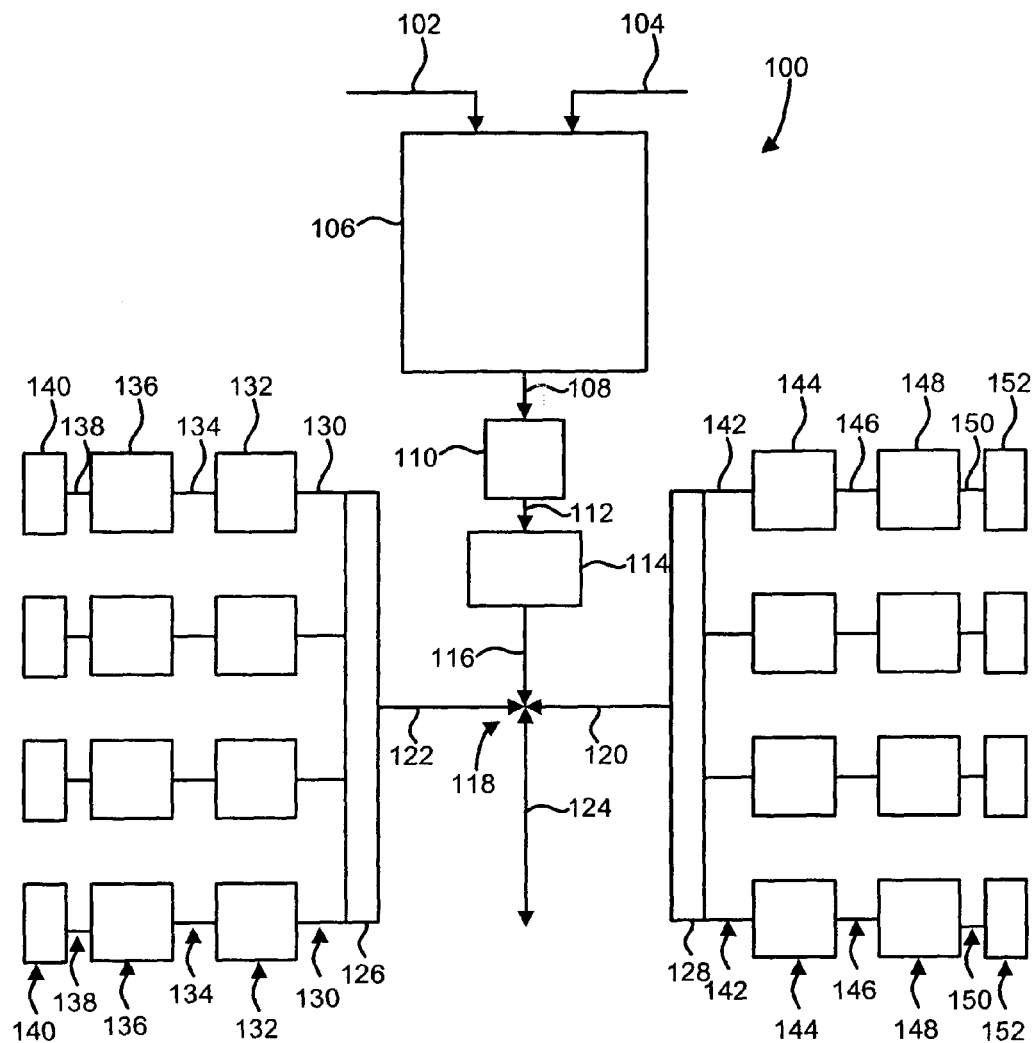
FIG. 1 illustrates a block diagram of the system for making PET sheets according to an embodiment of the present invention.

The term PET films generally means a rigid film of PET or APET of at least 5 mils. This sheet can be converted into rolls of different diameters or directly slit into sheets. PET and APET resin are used interchangeably as the resin used to manufacture the APET rigid film. Like reference numerals are used to indicate like parts throughout the drawings. FIG. 1 illustrates an embodiment 100 of a system for making PET sheets. Precursors or raw materials are fed into the reactor 106 of the system for making PET sheets 100. In one embodiment, the precursors include a feedstock of Pure Terephthalate Acid ("PTA") or Dimethyl Terephthalate ("DMT") 102 and a feedstock of Mono Ethylene Glycol ("MEG") 104. In another embodiment, another glycol, such as DEG may be used. In another aspect of the present invention, secondary precursors, such as Cyclohexanedimethanol (CHDM) may be used in combination with the primary precursors, such as MEG. In this aspect, the final product is a glycolized polyester (PETG).

In one embodiment, the two feedstocks 102 and 104 produce an intermediate bis-(2-hydroxyethyl)terephthalate, which may be converted to polyethylene terephthalate by heating at a temperature above the boiling point of the ethylene glycol or the reaction mixture under conditions effecting the removal of the glycol or water. The feedstocks 102 and 104 are reacted in the reactor 106 by esterification and polymerization to produce the PET melt. The heating in the reactor 106 may occur at a temperature as high as 325° C., if desired. During heating, pressure is reduced so as to provide rapid distillation of the excess glycol or water. The final polyethylene terephthalate polymer may have an I.V., as measured in orthochlorophenol at 25° C., in excess of 0.3 dl/gm. More preferably, the I.V. of the polymer ranges from about 0.4 to about 1.0 dl/gm, measured in orthochlorophenol at 25° C. Still more preferably, the polyethylene terephthalate employed in the present system for making PET sheets 100 has an I.V. of about 0.5 to about 0.7 dl/gm as measured in orthochlorophenol at 25° C. The thermoplastic polyester containing polymers of this present system for making PET sheets 100 have a preferred melting point in the range of from about 200° C. to about 330° C. or more preferably from about 220° C. to about 290° C. and most preferably from about 250° C. to about 275° C.

In one aspect, the present system for making PET sheets 100 produces PET sheets. In another aspect, the present system for making PET sheets 100 is used to produce all types of products, including sheets, with all other types of molten polymers. Another exemplary molten polymer is a linear low density polyethylene (LLDPE) polymer. In addition to homopolymers, the present system for making PET sheets 100 may be used with copolymers of PET, such as adding cyclohexane dimethanol (CHDM) in place of the ethylene glycol or isophthalic acid in place of some of the terphthlate units. These are examples of slurry copolymers off the base reaction that can be utilized in this manufacturing process.

Many different kinds of additives can also be added into the PET melt, depending on the nature of the desired properties in the finished article. Such additives may include, but are not limited to, colorants, anti-oxidants, acetaldehyde reducing agents, stabilizers, e.g. U.V. and heat stabilizers, impact modifiers, polymerization catalyst deactivators, melt-strength enhancers, chain extenders, antistatic agents, lubricants, nucleating agents, solvents, fillers, plasticizers and the like. Preferably, these additives are added into the reactor 106, but may be added at other locations of the present system for making PET sheets 100.

The PET melt is then fed via pipe 108 to a master pump 110 where it is pumped to a filter 114 via pipe 112. In this embodiment, the master pump 110 feeds the PET melt throughout the distribution subsystem. The PET melt is based through the filter 114 to clear the PET melt of any foreign particles either introduced through the feed stream or produced by the reaction. Preferably, the filter 114 is used to screen out any large gels, degraded particles or extraneous material deleterious to the downstream melt pumps or to the final product. Various grades of filter medium or mediums (mechanical screens, sand, sintered metal, etc.) can be used. The proper design (volume, pressure drop and residence time) of the filter 114 is important to maintain the proper pressure throughout the present system for making PET sheets 100.

The PET melt is then fed to a valve 118 via pipe 116. In this particular embodiment, the valve 118 is a four way valve including one inlet and three outlets. Preferably, valve 118 may have any number of outlets to fit a desired application. The valve 118 feeds PET melt into a bypass chip stream 124. This stream produces PET pellets that are conditioned to produce low acetaldehyde PET. This material can be sold directly for bottles or utilized in a coextrusion process (FIG. 2) to produce a multi-layered film. Additionally, the valve 118 also feeds PET melt into two distribution manifolds 126 and 128 feeding a multitude of forming streams. Although two distribution manifolds 126 and 128 are shown, one or more than distribution manifolds can be used. Preferably, manifolds 126 and 128 are designed to provide minimum residence time and flow of the PET melt through each down stream units such that the residence time and pressure drop are optimized. Preferably, the lay-out, design, and sizing of the downstream equipment is considered in determining the residence time and flow of the PET melt through the manifolds 126 and 128.

Distribution manifold 126 feeds the PET melt to one or more acetaldehyde reduction units 132 via pipes 130. Similarly, distribution manifold 128 feed PET melt to one or more acetaldehyde reduction units 144 via pipes 142. The acetaldehyde content of the PET is directly related to the time in each channel. Acetaldehyde reduction units 132 and 144 reduce the acetaldehyde content in the forming channels, pipes, or system to preferably less than 10 parts per million ("PPM"). If the pipes 108, 112, 116, 120, 122, 130, and 142 has a sufficiently low residence time to produce less than 10 PPM, then no acetaldehyde reduction units 132 and 144 may be required.

The acetaldehyde reduction units 132 and 144 may include thin film evaporators, vacuum degassing, acetaldehyde scavenger additions, or any other process to reduce acetaldehyde in a continuous melt stream. The acetaldehyde reduction units 132 and 144 can be, but not limited to, a thin film device, a vacuum screw section, or an acetaldehyde additive feeder with static mixer. In one aspect, the acetaldehyde reduction units 132 and 144 may be any apparatus known in the art for generating a large amount of surface area per unit volume and/or for rapidly regenerating the exposed melt surface. The acetaldehyde reduction units 132 and 144 should subject the liquid surface to a low partial pressure of acetaldehyde either by inert gas purging as described in U.S. Pat. No. 5,597,891, applied vacuum or both. The acetaldehyde reduction units 132 and 144 may be a vented single-screw extruder (U.S. Pat. No. 4,107,787), a vented twin-screw extruder (U.S. Pat. No. 3,619,145), a rotating disk processor (U.S. Pat. No. 4,362,852), or device which generates thin strands of polymer (U.S. Pat. No. 3,044,993), all of which are incorporated herein by reference.

The acetaldehyde reduction units 132 and 144 may also include suitable mixers, such as static mixers, gear pumps, and/or single or multi-screw extruders, all of which are well known in the art. In one aspect, an acetaldehyde stripping agent is injected into the acetaldehyde reduction units 132 and 144 by an injection nozzle (not shown) at a rate of about 1.0 SCF/lb of the polymer or less. The activity of the mixer forms a multitude of small gas bubbles in the PET melt. The acetaldehyde and other by-products present in the PET melt diffuse into the gas. Suitable stripping agents that are inert to the PET melt include nitrogen, carbon dioxide, $C_1$ to $C_4$ hydrocarbons, dehumidified air, and the noble gases. The more preferred stripping agents are carbon dioxide and nitrogen. Throughout the process, the PET melt is maintained at a temperature greater than the melting point of the PET melt, but preferably no greater than from about 10° C. to about 15° C. higher than its melting point.

In one embodiment, the acetaldehyde reduction units 132 and 144 include a vacuum section with a screw element in the line through the vacuum section. The vacuum will reduce the acetaldehyde content and the screw element will internally increase the melt pressure after the vacuum section is passed. Preferably, the pressure is reduced during vacuuming to prevent the PET melt from going through the vacuum port, then the pressure may be increased with the screw element.

The PET melt is then fed from the acetaldehyde reduction units 132 and 144 to pumps 136 and 148 via pipes 134 and 146, respectively. The pumps 136 and 148 are used to produce a constant pressure into the die forming units 140 and 152 via pipes 138 and 150, respectively. The plurality of pumps 136 and 148 are gear pumps which pass a known volume through with each revolution. The speed of the pumps 136 and 148 may be controlled by a pressure sensor on the outlet side. As the pressure is reduced, the pumps 136 and 148 speed up and vice versa on high pressure.

In one embodiment, the present system for making PET sheets system for making PET sheets 100 is a continuous process which is not shut down once it is started. One way to control the mass flow of the PET melt through the present system for making PET sheets 100 is by adjusting the mass flow of the feedstocks 102 and 104 into the reactor 106. A pressure feed back loop can be used to control the valve 118. The valve 118 to the bypass chip stream 124 can be opened more or less to modulate the PET melt going into each distribution manifold 126 and 128. The pumps 136 and 148 are used to control the final pressure into the die forming units 140 and 152. Nevertheless, due to the critical nature of the pressure entering the die forming units 140 and 152, it may be necessary or preferably to add more than one pump at this point. The additional pumps (not shown) may be used in tandem and are controlled by a pressure feed back loop to change the mass flow of PET melt into the die forming units 140 and 152 as the forming line changes speed or are shut down. Although a single pump can be used, the variation in pressure do to the influence of pressure changes from any other section in the entire distribution system may not sufficient to maintain part dimensional uniformity. As an example, it is preferable to maintain +/−1 bar in pressure into a flat die to maintain proper control of the finished sheet.

In one embodiment, the present system for making PET sheets 100 produces PET sheets in a continuous mode from PTA and MEG directly from the melt phase of the reactor 106 to an extruder die without passing through a nitrogen treatment, an extruder and other steps and rolled or not in the longitudinal direction. In another embodiment, the present system for making PET sheets 100 flows the PET melt directly from the reactor 106 and an extruder die onto rotary dies for the manufacturing of packaging material and other items.

In one embodiment, the die forming units 140 and 152 are three roll stack of air knife systems. More preferably, the die forming units 140 and 152 are horizontal three roll stack systems. Typically, down stream of the roll stack are auxiliary systems such as coaters, treators, slitting devices, etc. that feed into a winder. These units are properly specified to the individual leg of the manifold and to the overall capacity of the reactor 106.

In another embodiment, another type of unit would be a low draw rotary die that forms parts such as bottle caps or lids directly on the rotary die from the formed sheet.

In one embodiment, there is one pump 110 feeding the manifold systems 126 and 128. Preferably, at the end of each manifold leg, prior to the die and sheet or rotary die, there are one or two individual pumps 136 and 148, respectively. Preferably, pump 110 maintains the pressure into the manifolds 126 and 128. This pump 110 is controlled by the pumps 136 and 148. If the pressure drops the pump 110 will increase pressure. If the pressure rises then either the pump 110 slows down or the PET melt material is switched into the bypass chip stream 124 bypassing the manifolds 126 and 128. Preferably, if the manifolds 126 and 128 are going to be have a lower throughput for an extended period of time, such as for several hours, then a signal will be given to the reactor 106 to slow the feed to compensate for the lower throughput. Where pumps 136 and 148 include two pumps in series, the first pump of the multiple pump arrays is used to modulate the pressure in the manifolds 126 and 128, respectively. In this arrangement, the first pump in the series of pumps comprising pumps 136 and 148 maintains a constant pressure head into the second pump in the series of pumps. Preferably, the multiple pumps provides highly dependent thickness control with a constant pressure into the die forming units 140 and 152. The first pump will modulate any large swings in pressure. The second pump and each proceeding pump will further reduce any modulation down to less then +/−1 bar after the final pump. This provides for the forming lines (outputs) to remain independent so they can slow down, start stop or increase speed independently of the other die forming units 140 and 152. The pressure control loops with the bypass chip stream 124 will provide this function. In one embodiment, the pumps are volumetric pumps as described herein.

In one aspect, APET melt, which may be used to prepare the PET sheet, is produced by melting PET pellets into an extruder and then dropping it onto a surface where the melt is formed into a sheet. In the case of the preparation of items using a rotary die, the melt is passed through a extruder die and deposited directly onto a rotary die, where the items are manufactured.

In another embodiment, the mass flow of PET melt may be controlled by controlling the pressure of said PET melt with pressure control loops in communication with the pumps 136 and 148 prior to the die forming units 140 and 152 to control pressure and maintain pressure independently of the individual pipes 138 and 150 throughput requirements or what the other individual pipes 138 and 150 or flow channels are producing.

The pressure control logic controls the continuous slurry reactor 106 whose response time is typically greater in magnitude than that at the output ends at the die forming units 140 and 152 to control the thickness of the final product or sheet. In one embodiment, this is accomplished while having each output leg remain independent of the other output legs. In one embodiment, the control loop provides for sudden process upsets, such as starting or stopping of one of the output legs. In this embodiment, a bypass chip stream 124 allows for the chip production to increase or decrease based on any process upset. The upset can be a planned upset, such as stopping a line for maintenance, etc., or unplanned upset, such as an equipment malfunction.

In addition to the above, the control loop preferably compensates for one leg increasing or decreasing speed while continuing the overall system for making PET sheets 100 in a steady state. The pump 100 and associated valves (not shown) will react by diverting to or from the bypass chip stream 124. This may cause a brief spike or change in pressure that will be reacted to by the pumps 136 and 144 at the end of each manifold 126 and 128 that will then react to the pressure spike and modulate it in a controllable and desirable fashion. In this embodiment, the individual pumps that comprise the pumps 136 and 144 will experience the pressure spike and react to it while the second pump in the series will experience the modulation of the upset magnitude that will be sufficiently low as to be modulated out in the order of magnitude of less than a second. In another embodiment, each line configuration is going to be different so individual schemes will apply to that system. Preferably, a combination of the manifolds 126 and 128, pumps 136 and 144, and control loop provide an optimized PET melt pressure and flow through the pipes to the forming portions or die forming units 140 and 152.

Figure 2:
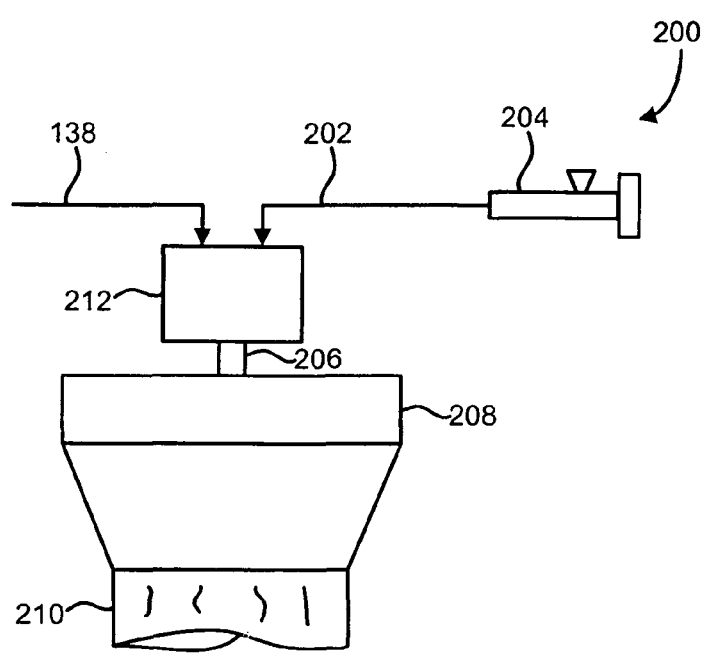
FIG. 2 illustrates block diagram of a die and co-extruder of the system for making PET sheets according to an embodiment of the present invention.

FIG. 2 shows an embodiment 200 of a co-extrusion subsystem to produce multi-layered sheet by adding a co-extruder 204 to the PET melt contained in pipe 138 or 150. The co-extruded material is fed from the co-extruder 204 to a feed block 212 via pipe 202 along with the PET melt from the flow channels as described above. The feed block 212 then layers the materials properly into the flat die 208. This feed block 212 orientates the streams producing a multi-layer stream, which is fed to a flat die 208 via pipe 206 where it is extruded into the sheet forming section or PET sheet 210. The co-extruder 204 can use resin pellets from the bypass chip stream 124 or be a different material such as an adhesive tie layer or barrier resin, but not limited to these examples. This co-extrusion process may be added to any or all the die forming units 140 and 150. In one embodiment, the size of the co-extruder 204 is designed relative to the pounds throughput required. In using a co-extruder 204 in the present system for making PET sheets 100, preferably, the added pounds of material added into the system must be taken into account to provide the required cooling capacity of the leg of the present system for making PET sheets 100.

Figure 3:
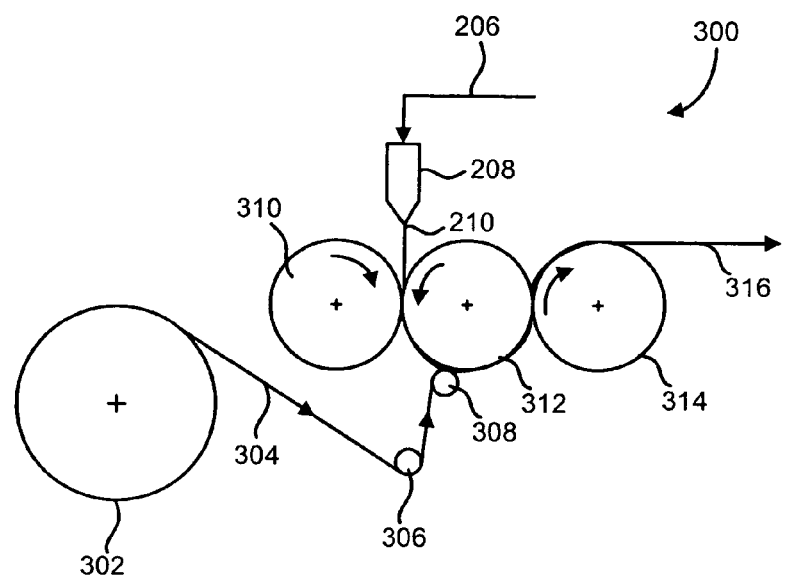
FIG. 3 illustrates a block diagram of a die and laminated sheet subsystem of the system for making PET sheets according to an embodiment of the present invention.

FIG. 3 shows an embodiment 300 of a subsystem to create a laminated multi-layered structure or PET sheet. The PET melt (either single layered or multi-layered coextruded) is fed through the flat die 208 via pipe 206 into the forming rolls 310 and 312. In one embodiment, an additional film 304 is fed into the forming rolls 308 and 310. The heat from the PET melt stream bonds the additional film 304 into a coherent laminated structure 316. Additional rollers 306 and 308 may be employed for guiding the additional film from the feed spool 302 to the forming rolls 312. In another embodiment, other materials such as metal foils, or EVOH film can be added to the laminating process. In yet another embodiment, other types of materials may be added to the laminating process. Each of these unique structures then can be used for specific end applications.

Preferably, the design criteria for the subsystem to create a laminated multi-layered structure or PET sheet 300 is to provide the highest quality sheet from the lowest capital investment. The high throughput of PET melt through the system for making PET sheets 100 requires good design of cooling rolls so deflections do not occur. The ability to monitor and control thickness of the PET sheets during cooling is important. In addition, the ability to change sizes and thicknesses of PET sheets is important as well. Further downstream operations, such as winding and slitting are also considered when using the laminated multi-layered structure or PET sheet 300.

As has been shown, the resulting product or PET sheet is determined by the die forming units 140 and 152. This present system for making PET sheets 100 controls the die forming units 140 and 152 with such precision (as well as an extrusion system) that the objects produced by this system are limited only by the creativity of the manufacturer.

In one embodiment, the present system for making PET sheets 100 controls the pressure from a continuous reactor 106 to multiple flow channels. Each channel is tied to a forming section producing different objects. Each flow channel acts as an individual extruder without an extruder. In another embodiment, a single pump 136 may be used if the pump dynamics are accounted for in the process control algorithm.

In one embodiment, the present system for making PET sheets 100 impacts favorably the mechanical and optical properties of the PET sheet being manufactured that will enable the PET sheet to be manufactured at a lower caliper when being manufactured for packaging or other application such a sheets, strapping, architectural items.

The present system for making PET sheets 100 produces PET objects and articles that have quality of trim and other waste generated as part of the manufacturing process will be of high quality such that it can be blended in high percentages with virgin PET melt without negatively impacting the final sheet quality and the need to increase caliper.

Figure 4:
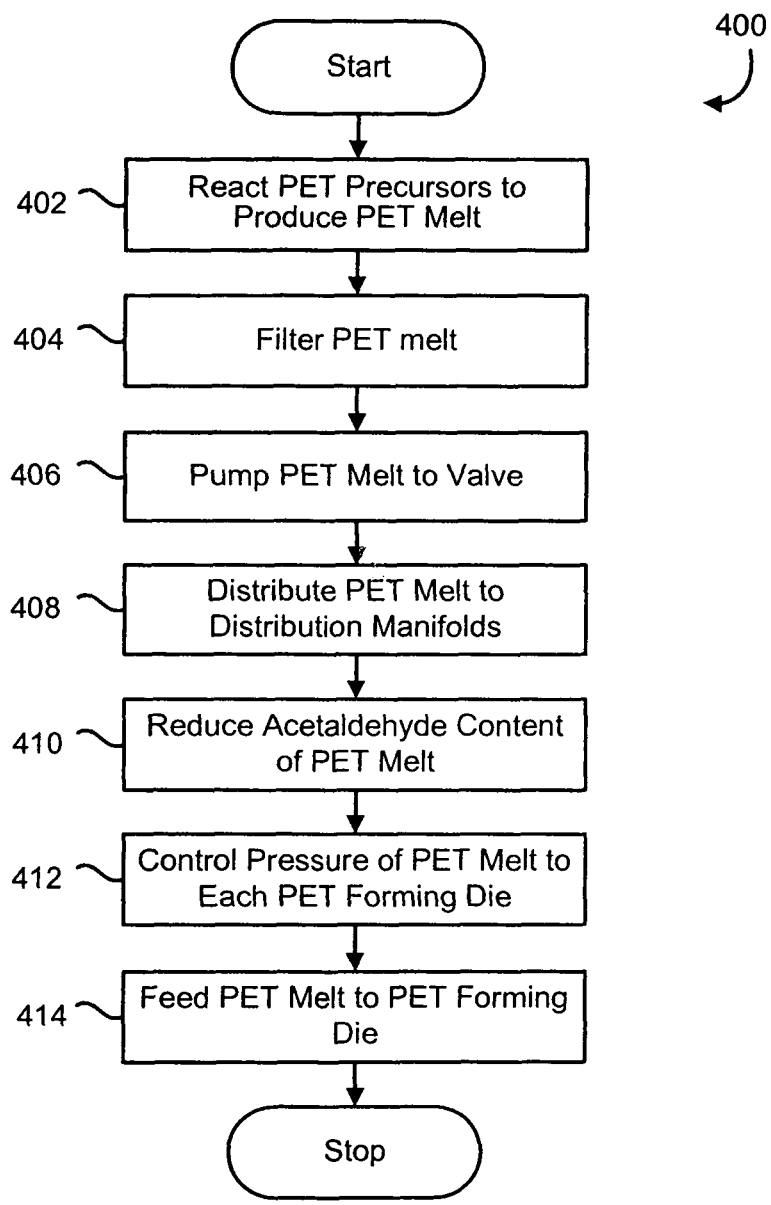
FIG. 4 illustrates a flow diagram of a process for making PET sheets according to an embodiment of the present invention.

In addition to the aforementioned aspects and embodiments of the present system for making PET sheets system for making PET sheets 100, the present invention further includes methods for manufacturing these PET sheets. FIG. 4 illustrates a flow diagram of an embodiment 400 of one such process. In step 402, a first PET precursor and a second PET precursor as described above are reacted in a reactor to produce a PET melt. Preferably, in this step, the known reactor capacity and a given product mix of sheet thicknesses and widths are determined. From this information the number of manifold legs is determined by considering the cooling capacity of each of the die forming units. The cooling capacity preferably determines the maximum throughput of each downstream leg. In one aspect, a bypass chip stream 124 can be introduced into the reactor 106 at this step. In another aspect, a side stream of scraps from the previous operation may be introduced into the reactor 106 at this step.

In step 404, the PET melt is filtered to remove impurities from the PET melt. In step 406, the PET melt is flowed via a positive or negative displacement apparatus, such as a pump, to a valve having preferably multiple outlets. In step 408, the PET melt is flowed from the valve outlets to individual distribution manifolds connected to each individual valve outlet. In one embodiment, each of two outlets is connected to a separate distribution manifold. Connected to each distribution manifold are at least one distribution lines that preferably terminate at a PET object die forming apparatus. In addition, one of the outlets of the valve feeds a side chip stream for forming PET pellets.

In step 410, the acetaldehyde content of the PET melt is reduced if necessary as described above. This may include using a vacuum section with a driven screw section in the line to reduce the acetaldehyde content in the PET melt. In another embodiment, a thin film degassing technique may be used to reduce the acetaldehyde content in the PET melt.

In step 412, the pressure or mass flow of the PET melt is individually controlled in each of the distribution lines by a pump or other apparatus that controls the mass flow or pressure of the PET melt within each distribution line separate from the other distribution lines. In step 414, the PET melt in each distribution line is fed to a PET object forming die or sheet forming subsystem.

Although there has been described what is at present considered to be the preferred embodiments of the system for making PET sheets, it will be understood that the present system for making PET sheets can be embodied in other specific forms without departing from the spirit or essential characteristics thereof. For example, additional pumps or different combinations of pumps, other than those described herein could be used without departing from the spirit or essential characteristics of the present system for making PET sheets. The present embodiments are, therefore, to be considered in all aspects as illustrative and not restrictive. The scope of the present system for making PET sheets is indicated by the appended claims rather than the foregoing description.

What is claimed:

1. A method for reducing intermediate processing steps for making PET objects comprising:
    reacting a first PET precursor and a second PET precursor to produce a PET melt in a reactor;
    flowing said PET melt to a valve having at least two outlets;
    flowing said PET melt from at least one of said at least two outlets to at least one distribution manifold, each of said at least one distribution manifold having at least two distribution lines;
    controlling the residence time in each of the at least two distribution lines for controlling the acetaldehyde content in said PET melt,
    providing a first pump configured to control the residence time, the first pump located between the valve and the reactor;
    controlling individually the mass flow of the PET melt in each of said at least two distribution lines independently of the other of said at least two distribution lines;
    providing a second and third pump, the second and third pump configured to control the residence time in each of the at least two distribution lines, the second pump located between the at least one distribution manifold and a first forming die, the third pump located between the at least one distribution manifold and a second forming die;
    controlling a first speed of the first pump responsive to a first and second pressure at the second and third pump respectively; and
    forming said PET objects from said PET melt with the first and second forming die.

2. The method of claim 1 further comprising:
    flowing said PET melt from one of said at least two outlets to a side chip stream for forming pellets.

3. The method of claim 1 wherein said reacting takes place within a temperature range of from about 200° C. to about 330° C.

4. The method of claim 1 wherein said first PET precursor is selected from the group consisting of Pure Terephthalate Acid (PTA) and Dimethyl Terephthalate (DMT).

5. The method of claim 1 wherein said second PET precursor is selected from the group consisting of Mono Ethylene Glycol (MEG), Diethylene Glycol (DEG), and glycolized polyester (PETG).

6. The method of claim 1 further comprising:
    reducing the acetaldehyde content of said PET melt.

7. The method of claim 1 wherein said controlling individually the mass flow of the PET melt comprises:
    controlling the pressure of said PET melt with pressure control loops prior to said forming said PET objects.

8. The method of claim 1 wherein said PET objects are selected from the group consisting of PET articles, PET sheets, strapping, and architectural items.

9. The method of claim 1 wherein said forming PET objects further comprises:
    adding at least one side extruder to produce a multi-layered PET sheet or object.

10. The method of claim 9 further comprises:
    producing a laminated structure selected from the group consisting of foil and EVOH structure.

11. The method of claim 1 further comprising:
    filtering said PET melt prior to said forming said PET objects.

12. The method of claim 1, further comprising:
    compensating for a change of speed in one of the at least two distribution lines with the second and third pump.

13. The method of claim 12, wherein a pressure control logic controls the compensating.

14. The method of claim 13, wherein the second and third pump modulate a pressure spike resulting from the change of speed in one of the at least two distribution lines.

15. A method for reducing intermediate processing steps for making PET objects comprising:
    reacting a first PET precursor and a second PET precursor to produce a PET melt in a reactor;
    flowing said PET melt to a valve having at least two outlets;
    flowing said PET melt from at least one of said at least two outlets to at least one distribution manifold, each of said at least one distribution manifold having at least two distribution lines;
    controlling the residence time in each of the at least two distribution lines for controlling the acetaldehyde content in said PET melt,
    providing a first pump configured to control the residence time, the first pump located between the valve and the reactor;
    controlling individually the mass flow of the PET melt in each of said at least two distribution lines independently of the other of said at least two distribution lines;
    providing a second and third pump, the second and third pump configured to control the residence time in each of the at least two distribution lines, the second pump located between the at least one distribution manifold and a first forming die, the third pump located between the at least one distribution manifold and a second forming die;

compensating for a change of speed in one of the at least two distribution lines with the second and third pump, wherein a pressure control logic controls the compensating;

forming said PET objects from said PET melt with the first and second forming die.

16. The method of claim 15, wherein the second and third pump modulate a pressure spike resulting from the change of speed in one of the at least two distribution lines.

\* \* \* \* \*